United States Patent
Villyard et al.

(10) Patent No.: US 11,855,267 B1
(45) Date of Patent: Dec. 26, 2023

(54) METHODS AND APPARATUS FOR CONTROLLING COOLING CAPACITY OF A MULTI- EVAPORATOR COOLING SYSTEM

(71) Applicant: Motiv Power Systems, Inc., Foster City, CA (US)

(72) Inventors: Joshua Guy Villyard, Redwood City, CA (US); James Michael Castelaz, Alameda, CA (US); Jared Wayne Bowen, Mountain View, CA (US)

(73) Assignee: Motiv Power Systems, Inc., Foster City, CA (US)

( * ) Notice: Subject to any disclaimer, the term of this patent is extended or adjusted under 35 U.S.C. 154(b) by 0 days.

(21) Appl. No.: 17/165,353

(22) Filed: Feb. 2, 2021

(51) Int. Cl.
| | |
|---|---|
| *H01M 10/613* | (2014.01) |
| *H01M 10/625* | (2014.01) |
| *H01M 10/6569* | (2014.01) |
| *H01M 10/6568* | (2014.01) |
| *H01M 10/633* | (2014.01) |

(52) U.S. Cl.
CPC ....... *H01M 10/613* (2015.04); *H01M 10/625* (2015.04); *H01M 10/633* (2015.04); *H01M 10/6568* (2015.04); *H01M 10/6569* (2015.04); *H01M 2220/20* (2013.01)

(58) Field of Classification Search
CPC ............. H01M 10/613; H01M 10/625; H01M 10/633; H01M 10/6568; H01M 10/6569
See application file for complete search history.

(56) References Cited

U.S. PATENT DOCUMENTS

| | | | |
|---|---|---|---|
| 5,526,650 A | 6/1996 | Iritani et al. ....... | B60H 1/00907 62/205 |
| 6,089,034 A | 7/2000 | Lake et al. .............. | F25B 41/20 62/204 |
| 2006/0123815 A1 | 6/2006 | Kim et al. .............. | F25B 13/00 62/200 |
| 2013/0139530 A1* | 6/2013 | Tutunoglu ............ | F25B 49/005 62/89 |

(Continued)

FOREIGN PATENT DOCUMENTS

| | | |
|---|---|---|
| CN | 203727131 | 7/2014 |
| JP | 8178445 | 6/1996 |

*Primary Examiner* — Karie O'Neill Apicella
(74) *Attorney, Agent, or Firm* — Adibi IP Group, PC; Amir V. Adibi; Andrew C. Palmer (57) ABSTRACT

A vapor-compression multi-evaporator cooling system comprises a cooling control system and two or more evaporators each coupled to an expansion valve. Each evaporator is selectively enabled or disabled during operation. When an evaporator is enabled, the evaporator transfers heat into a working fluid within the system. When an evaporator is disabled, the evaporator does not exchange any appreciable amount of heat within the system. The cooling control system includes a cooling controller, an adjustable compressor, a condenser, and a variable speed fan that provides selectable amounts of cooling to the condenser. During operation, the cooling controller adjusts the compressor operation and fan speed to maintain stable operation of the cooling system. To compensate for enabling or disabling of evaporators, the cooling controller adjusts compressor operation and fan speed to provide more or less compression and more or less condenser cooling to maintain stable and efficient operation of the cooling system.

19 Claims, 7 Drawing Sheets

(56) References Cited

U.S. PATENT DOCUMENTS

2015/0295285 A1  10/2015  Tekeuchi et al. ......... F25B 5/00
                                                   62/498
2019/0225047 A1* 7/2019  Porras ....................... F25B 5/02

* cited by examiner

METHODS AND APPARATUS FOR CONTROLLING COOLING CAPACITY OF A MULTI-EVAPORATOR COOLING SYSTEM

TECHNICAL FIELD

The described embodiments relate to cooling systems, and more particularly, to methods and apparatus for controlling cooling capacity of a cooling system with a selectable number of evaporators.

BACKGROUND INFORMATION

Cooling systems are used extensively in automotive applications to cool automotive components, such as batteries, or the cabin space of a vehicle. To optimize the longevity of a battery there is typically an optimal temperature range. In one example, a battery having a particular Li-ion chemistry has an optimal temperature range of 20-25 degrees Celsius. Maintaining this temperature can maintain the longevity of the battery by protecting the lifespan of cells within the battery. As such, there are a variety of cooling requirements in automotive applications. Designing a cooling system to meet those requirements presents significant challenges.

SUMMARY

A vapor-compression multi-evaporator cooling system comprises a cooling control system and two or more evaporators each coupled to an expansion valve. Each evaporator is selectively enabled or disabled during operation. When an evaporator is enabled, the evaporator transfers heat into a working fluid within the system. When an evaporator is disabled, the evaporator does not exchange any appreciable amount of heat within the system. The cooling control system includes a cooling controller, an adjustable compressor, a condenser, and a variable speed fan that provides selectable amounts of cooling to the condenser. During operation, the cooling controller adjusts the compressor operation and fan speed to maintain stable operation of the cooling system. To compensate for enabling or disabling of evaporators, the cooling controller adjusts compressor operation and fan speed to provide more or less compression and more or less condenser cooling as needed to maintain stable and efficient operation of the cooling system.

In one embodiment, a method is provided that includes adjusting cooling provided to a condenser of a cooling system in response to a comparison of a first system pressure to a first pressure setpoint, wherein the cooling system has a selectable number of evaporators. The method also includes adjusting operation of a compressor of the cooling system in response to a comparison of a second system pressure to a second pressure setpoint.

In another embodiment, a method is provided for controlling the cooling capacity of a cooling system which has a selectable number of evaporators. The method comprises measuring a pressure difference between a high side and a low side of the cooling system, and adjusting operation of a compressor and cooling provided to a condenser in response to a comparison of the pressure difference to a threshold.

In another embodiment, a cooling apparatus is provided that comprises a compressor, a selectable number of evaporators each with an expansion valve coupled to a condenser, a condenser coupled to the compressor and evaporators, and a fan that provides cooling to the condenser. The apparatus also comprises a controller that measures a pressure difference between a high side and a low side of the compressor, and when the pressure difference is less than a threshold, the controller controls the fan to decrease cooling provided to the condenser and the controller controls the compressor to increase compression.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some exemplary embodiments of the invention, examples of which are illustrated in the accompanying drawings.

In various embodiments, a vapor-compression cooling system is provided to meet the cooling requirements in automotive applications. A vapor-compression cooling system has four basic components. An evaporator is used to provide cooling while transferring heat into a refrigerant vapor. A compressor is used to compress the vapor. A condenser is used to extract heat from the high pressure refrigerant and transitions the refrigerant to a liquid state. An expansion valve is used to reduce the pressure of the liquid to produce a liquid/vapor combination that is input back into the evaporator. The refrigerant continues to circulate through the four components changing state between a liquid and a vapor to absorb heat in the evaporator and expel heat in the condenser.

Figure 1:
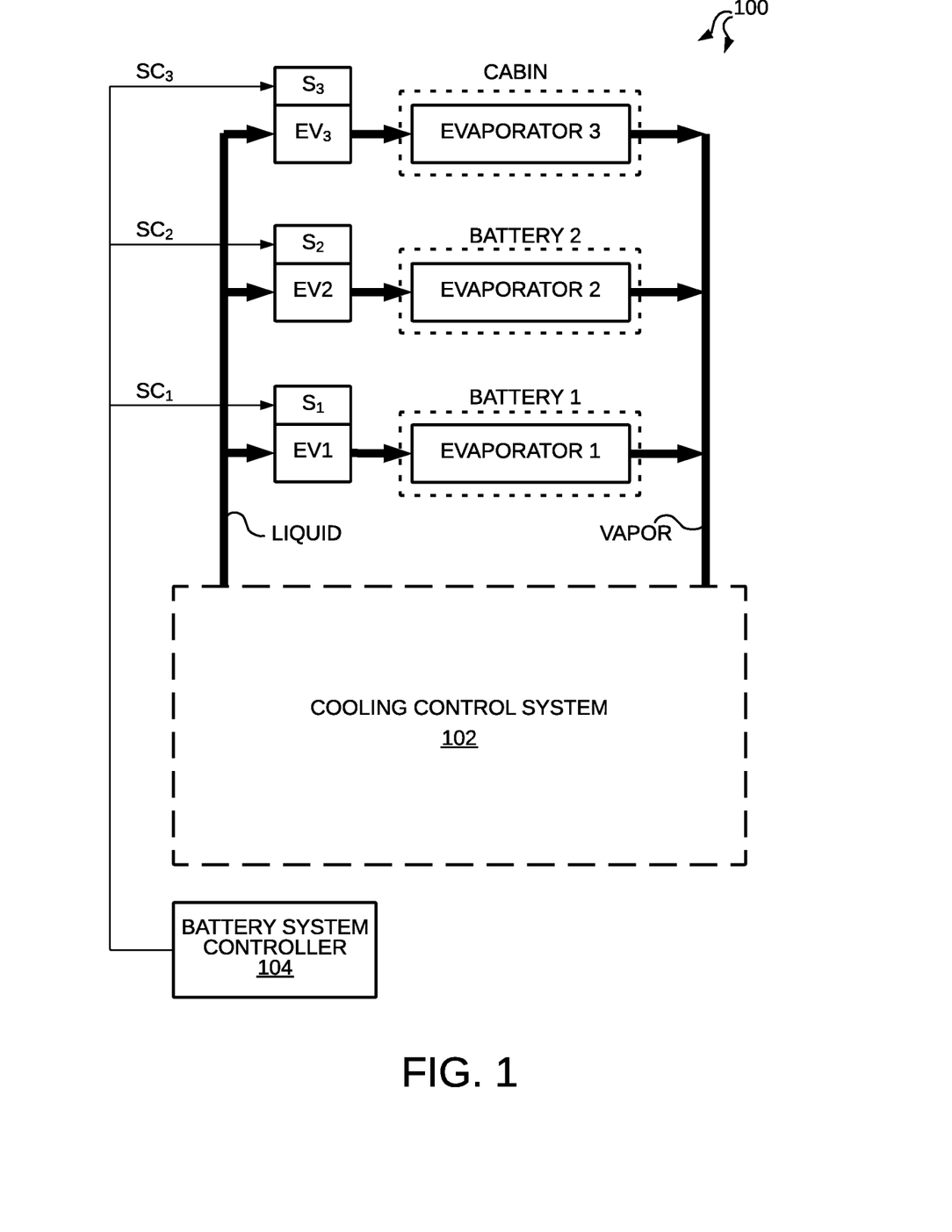
FIG. 1 shows an embodiment of a vapor-compression cooling system with a selectable number of evaporators for use in automotive applications.

FIG. 1 shows an embodiment of a vapor-compression cooling system 100 with a selectable number of evaporators for use in automotive applications. The system 100 includes a cooling control system 102 that is coupled to a first evaporator used to cool a first battery (Battery 1), a second evaporator used to cool a second battery (Battery 2), and a third evaporator used to cool a passenger cabin (Cabin) of a vehicle. The system 100 includes three expansion valves (EV1-3) that are coupled to the evaporators (1-3), respectively. Three switches (S1-3) enable or disable the operation of the expansion valves and thereby enable or disable the evaporators (1-3) into the cooling system. For example, the switches (S1-3) operate in response to switch control signals (SC1-3) generated by a battery system controller 104 that enables or disables cooling for the batteries and the cabin. Thus, the volume of the system changes based on the number of expansion valves (and associated evaporators) that are enabled.

During operation, liquid refrigerant flows from the cooling control system 102 to the three expansion valves (EV1-3) and into the evaporators depending on the state of the switches (S1-3). The evaporators provide cooling by transferring heat from their surroundings into the refrigerant to form a heated vapor that is output from the evaporators 1-3 and flows back into the cooling control system 102. The cooling control system 102 operates to extract the heat from the vapor and return the vapor to the liquid state to be recirculated through the system. As the expansion valves are enabled or disabled by the switches, the number of evaporators enabled in the system changes. In an embodiment, the control system 102 adapts to the changing number of enabled evaporators by adjusting components within the control system 102 to allow the cooling system to continue to operate under the new conditions. A more detailed description of the cooling control system 102 is provided below.

Figure 2:
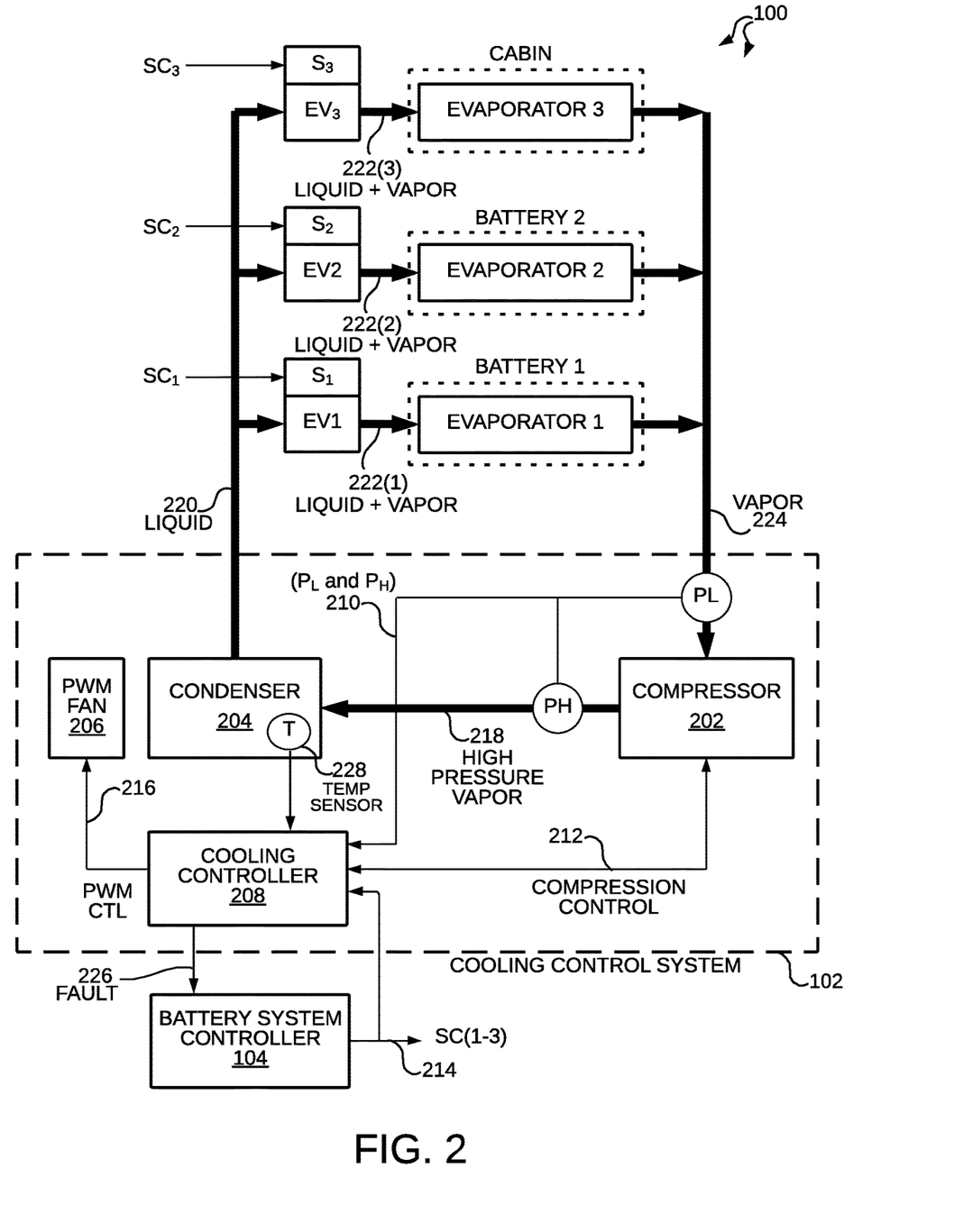
FIG. 2 shows a detailed embodiment of a control system shown in FIG. 1.

FIG. 2 shows a detailed embodiment of the cooling control system 102 shown in FIG. 1. The cooling control system 102 comprises a compressor 202, condenser 204, pulse width modulated (PWM) fan 206, and cooling controller 208. Pressure sensor PL measures pressure ($P_L$) on the low side (input) of the compressor 202 and pressure sensor PH measures pressure ($P_H$) on the high side (output) of the compressor 202.

The cooling controller 202 outputs a compression control signal 212 that controls the speed of the compressor 202 to adjust the amount of compression provided by the compressor 202. In this implementation, the compressor 202 is a rotary compressor that provides more compression as the speed is increased. However, other types of compressors can be utilized.

The cooling controller 208 also outputs a PWM control signal 216 that controls the speed of the fan 206. The fan 206 moves air across the condenser 204 to dissipate heat from the condenser 204. As the fan speed is increased more cooling is provided to the condenser 204.

The battery system controller 104 outputs the switch control signals (SC1-3) that control the switches (S1-3) to enable or disable the corresponding expansion valves (EV1-3). Thus, the battery system controller 104 is able to enable and disable cooling provided to the batteries and the cabin.

During operation, the battery system controller 104 outputs the switch control signals (SC1-3) to enable one or more of the evaporators into the cooling system. Liquid refrigerant 220 is output from the condenser 204 and input to the expansion valves EV1-3. One or more of these valves are enabled based on the state of the switches (S1-3). The liquid 220 passes through the enabled expansion valves and transitions state to become part liquid and part vapor (L+V), as indicated at 222(1-3). The evaporators 1-3 that are coupled to the enabled expansion valves receive the L+V 222(1-3) mixtures. The evaporators transfer heat from their surroundings into the L+V 222(1-3), which provides cooling to their surroundings and changes the state of the L+V 222(1-3) to a heated vapor 224.

The heated vapor 224 enters the compressor 202 on its low pressure side, where the pressure sensor PL measures the incoming pressure ($P_L$) of the vapor. The compressor 202 compresses the vapor and outputs high pressure vapor 218 from its output. The pressure sensor PH measures the pressure ($P_H$) of the vapor at the output of the compressor 202 (e.g., high pressure side). The compression control signal 212 is output from the cooling controller 208 and this signal controls the amount of compression provided by the compressor 202. For example, if the compressor is a rotary compressor, the compression control signal 212 controls the speed of the rotary compressor to change the amount of compression provided.

The high pressure vapor 218 output from the compressor 202 flows into the condenser 204, which condenses the vapor 218 to the liquid 202 by expelling heat. The fan 206 moves air across the condenser to dissipate the expelled heat. In an embodiment, the condenser 204 comprises a temperature sensor 228 that provides condenser temperature measurements to the cooling controller 208. The cooling controller 208 outputs the PWM control signal 216 to control the speed of the fan and the resulting air flow over the condenser 204. Thus, more or less air can be provided to control the amount of heat dissipated from the condenser 204.

Based on the number and selection of the evaporators that are enabled in the cooling system, the cooling controller 208 controls the amount of compression provided by the compressor 202 and the amount of cooling provided by the fan 206. In various embodiments, as the evaporators are enabled or disabled, the cooling controller 208 operates to adjust the compression and cooling of the system 100 to maintain cooling while operating within safe operating parameters.

In an embodiment, if the cooling controller 208 is unable to control the fan 206 or the compressor 202 to maintain desired operation, or if the system loses containment, a fault indicator 226 is generated by the cooling controller 208 and input to the battery system controller 104 to indicate a system failure.

Figure 3:
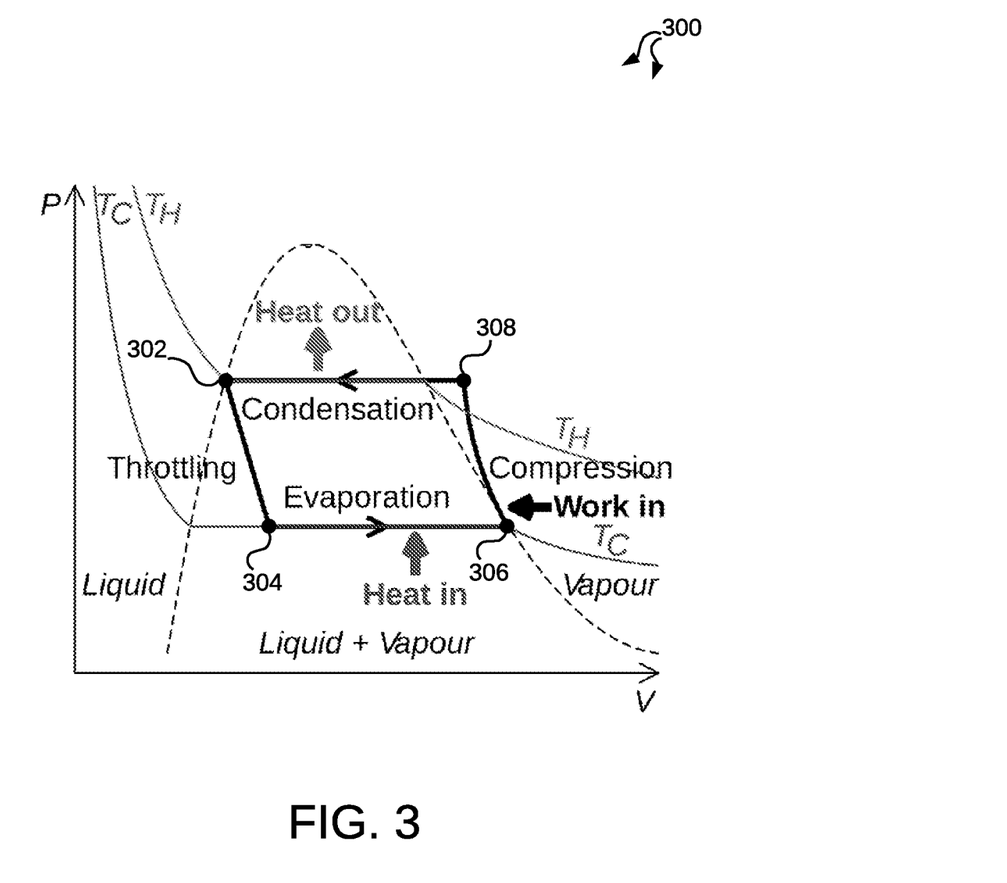
FIG. 3 shows a diagram that illustrates the operations of the cooling system shown in FIG. 2.

FIG. 3 shows a diagram 300 that illustrates the operations of the cooling system 100 shown in FIG. 2. For example, the output of the condenser 204 is a high temperature liquid, as indicated at 302. This liquid flows through the expansion valves (EV1-3) (e.g., throttling) and transitions to a (liquid+vapor) state, as indicated at 304. Evaporation occurs at the evaporators (1-3) to cool the surrounding area and heats the (liquid+vapor) to cause a transition to a vapor, as indicated at 306. This vapor is input to the low side of the compressor 202 and it is compressed to a high temperature vapor, as indicated at 308. The high pressure high temperature vapor at 308 is input back to the condenser 204 where heat is expelled and the vapor condenses back to a liquid, as indicated at 302. This cycle continues so that heat in the regions surrounding the evaporators (1-3) is input into the system, and that heat is output from the system at the condenser 204. This provides cooling to the regions surrounding the evaporators.

Figure 4:
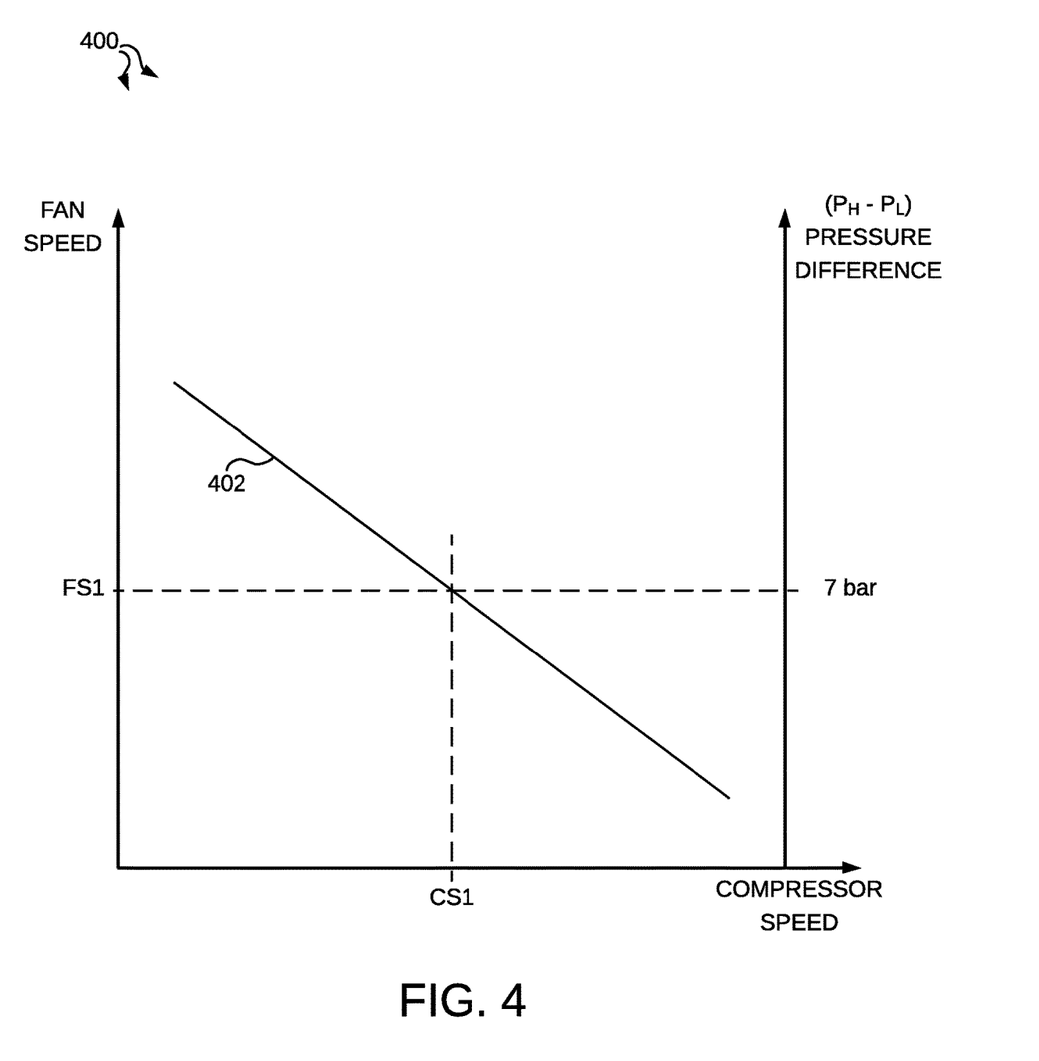
FIG. 4 shows a graph that illustrates a relationship between fan speed and compressor speed provided in various embodiments of the cooling system.

FIG. 4 shows a graph 400 that illustrates a relationship between fan speed (e.g., amount of cooling) and compressor speed (e.g., amount of compression) provided in various embodiments of the cooling system 100. For example, the fan speed represents the amount of cooling provided to the condenser 204, and the compressor speed represents the amount of compression provided by the compressor 202. The graph 400 also shows a pressure difference between the high side (output) pressure and low side (input) pressure of the compressor 202.

During operation, the cooling controller 208 receives the high side pressure measurement ($P_H$) and the low side pressure measurement ($P_L$) from the pressure sensors PH and PL, respectively. The cooling controller 208 computes the difference between these two pressures and outputs the PWM control signal 216 and the compression control signal 212 to adjust the fan speed and compression amount to maintain a 7 bar pressure difference between $P_H$ and $P_L$.

The plot line 402 illustrates an exemplary fan speed (FS1) and compressor speed (CS1) that will result in maintaining the 7 bar pressure difference. As the pressure difference increases, the cooling controller 208 operates to adjust the cooling system by outputting the fan control signal 216 to increase the fan speed (e.g., more cooling provided to condenser 204). The controller 208 also outputs the compression control signal 212 to decrease the speed of the compressor 202 (e.g., less compression applied to the vapor 224). As the pressure difference decreases, the cooling controller 208 operates to adjust the cooling system by outputting the fan control signal 216 to decrease the fan speed (e.g., less cooling provided to condenser 204). The controller 208 also outputs the compression control signal 212 to increase the speed of the compressor 202 (e.g., more compression applied to the vapor 224).

Thus, the cooling controller 208 continues to adjust the cooling system to maintain the 7 bar pressure difference. It should be noted that the 7 bar threshold is configurable and thus may be set to any other value to obtain desired operation of the cooling system.

The battery system controller 104 outputs the switch control signals (SC1-3) to enable or disable the expansion valves (EV1-3) to enable or disable the associated evaporators into the system. For example, the evaporators may be enabled or disable to configure the cooling system to cool the batteries and/or cabin space as needed. However, as discussed in greater detail below, the cooling controller 208 operates to adjust the amount of cooling provided to the condenser 204 and the amount of compression provided by the compressor 202 to compensate for changes in the number of evaporators that are enabled to maintain the 7 bar pressure difference.

Figure 5:
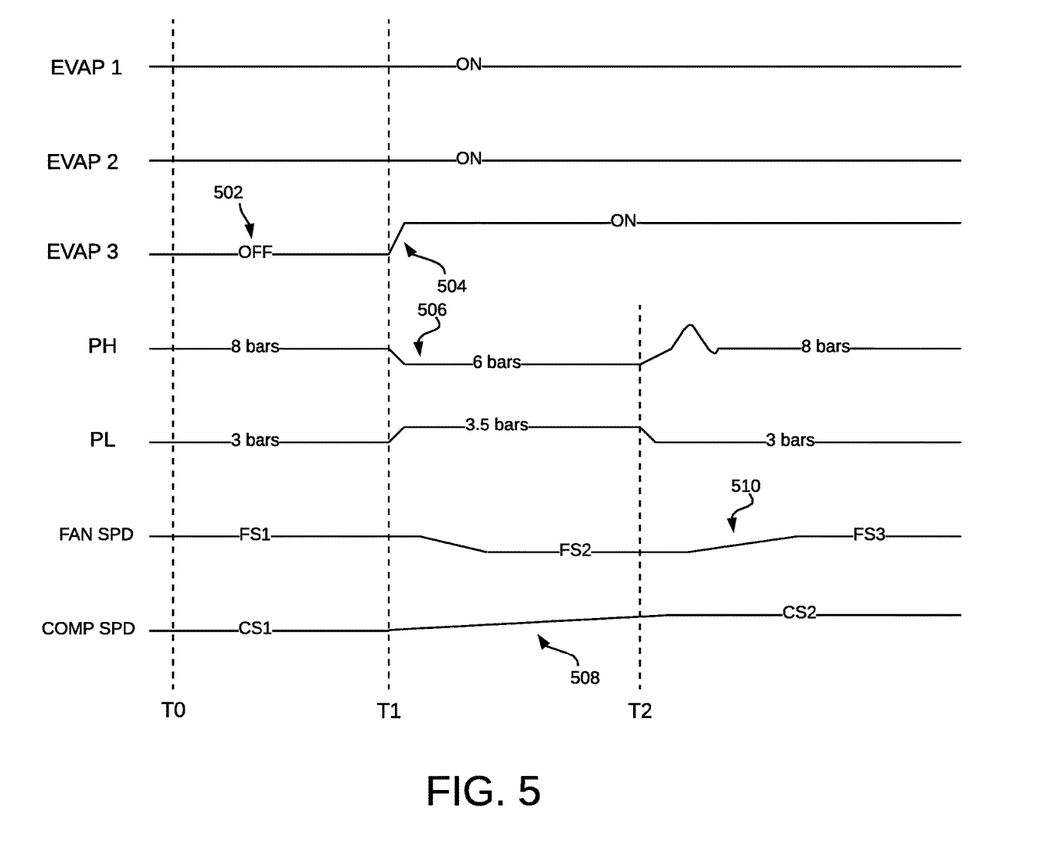
FIG. 5 shows a timing diagram that illustrates the operation of the cooling system to compensate for operation with different numbers of evaporators selected.

FIG. 5 shows a timing diagram 500 that illustrates the operation of the cooling system 100 to compensate for the number of evaporators enabled in the system. For example, changes to the number of evaporators enabled in the cooling system occur as the expansion valves (EV1-3) are enabled or disabled by the switches (S1-3).

At time T0, it will be assumed that the cooling system 100 is in stable operation, the expansion valves (EV1-2) are enabled and the expansion valve (EV3) is disabled. Thus, the evaporators 1-2 are "ON" and provide cooling to the batteries 1-2. However, the evaporator 3 is "OFF" (indicated at 502) and does not provide any cooling to the cabin space. The pressure difference ($P_H$-$P_L$) is maintained at 5 bars. To maintain this pressure difference, the cooling controller 208 sets the fan speed to FS1, and sets the compressor speed to CS1.

At time T1, the cabin space evaporator 3 is turned "ON" as indicated at 504. For example, the battery system controller 208 outputs the switch control signal SC3 to enable the expansion valve EV3 to allow the refrigerant liquid 220 to flow into the evaporator 3.

When evaporator 3 is enabled, a decrease in the pressure difference results. As illustrated at 506, the high side pressure (PH) decreases and the low side pressure (PL) increases. The cooling controller 208 calculates the decrease in the pressure difference and outputs the fan control signal 216 to decrease the fan speed to FS2, thereby decreasing the amount of cooling provided to the condenser 204. The cooling controller 208 also outputs the compression control signal 212 to ramp up the compressor speed, indicated at 508, to decrease compression. For example, the operation of the cooling controller 208 in response to the decrease in the pressure difference is described above with reference to FIG. 4.

At time T2, the pressure difference begins to increase. In response, the cooling controller 208 operates to maintain the compressor speed at CS2. The cooling controller 208 then ramps up the fan control signal 216 to increase the fan speed to FS3, as indicated at 510, thereby maintaining the pressure difference at 5 bars. The cooling system has now compensated for the change due to the activation of evaporator 3. After the system stabilizes, all three evaporators are actively providing cooling.

Figure 6:
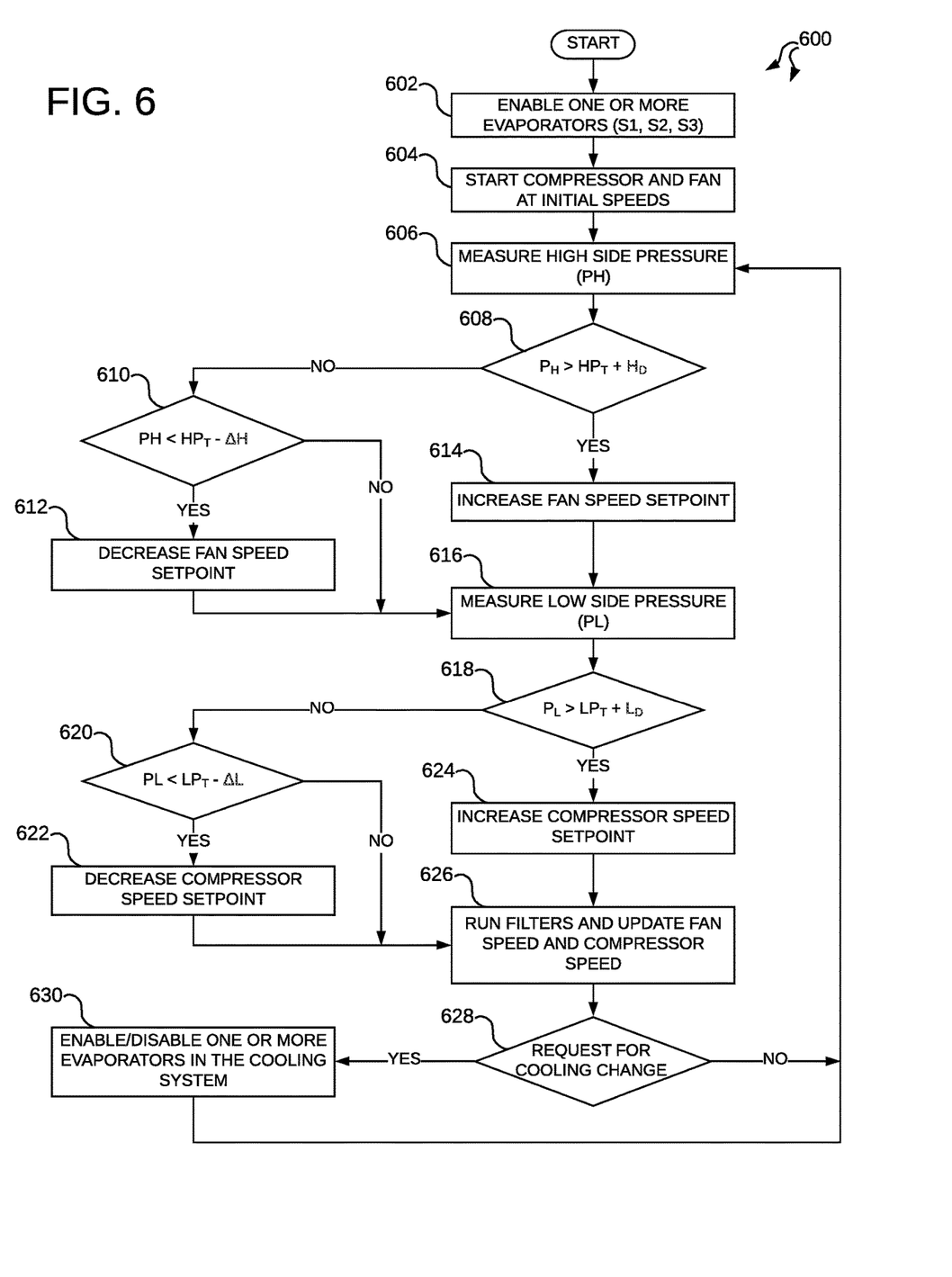
FIG. 6 shows an embodiment of a method for operating a vapor-compression cooling system which has a selectable number of evaporators.

FIG. 6 shows an embodiment of a method 600 for operating a vapor-compression multi-evaporator cooling system. For example, the method 600 is suitable for use with the cooling system 100 shown in FIG. 2.

At block 602, one or more evaporators are enabled. For example, the battery system controller 104 outputs the switch control signals (SC1-3) to enable the corresponding expansion valves, thereby enabling one or more of the evaporators 1-3.

At block 604, the compressor and fan are set to initial speeds. For example, the cooling controller 208 outputs the fan control signal 216 and the compression control signal 212 to set initial operating speeds for the fan 206 and the compressor 202.

At block 606, the high side pressure of the compressor is measured. For example, the cooling controller 208 receives high side ($P_H$) pressure measurement from the pressure sensors PH.

At block 608, a determination is made as to whether the high side pressure $P_H$ is greater than a high side pressure target ($HP_T$) plus a high side delta ($H_D$). The $H_D$ can be any small amount. For example, the cooling controller 208 makes this determination. If the high side pressure is not greater than $HP_T$ plus $H_D$, the method proceeds to block 610. If the high side pressure is greater $HP_T$ plus $H_D$, then the method proceeds to block 614.

At block 610, a determination is made as to whether the high side pressure $P_H$ is less than $HP_T$ minus $H_D$. For example, the cooling controller 208 makes this determination. If the high side pressure is not less than $HP_T$ minus $H_D$, the method proceeds to block 616. If the high side pressure is less than $HP_T$ minus $H_D$, the method proceeds to block 612.

At block 612, the fan speed set point is decreased. For example, the cooling controller 208 outputs the PWM control signal 216 to decrease the fan speed.

At block 614, the fan speed set point is increased. For example, the cooling controller 208 outputs the PWM control signal 216 to increase the fan speed.

At block 616, the low side pressure ($P_L$) of the compressor is measured. For example, the cooling controller 208 receives low side pressure ($P_L$) measurement from the pressure sensors PL.

At block 618, a determination is made as to whether the low side pressure $P_L$ is greater than a low side pressure target ($LP_T$) plus a low side delta ($L_D$). The $L_D$ can be any small amount. For example, the cooling controller 208 makes this determination. If the low side pressure is not greater than $LP_T$ plus $L_D$, the method proceeds to block 620. If the low side pressure is greater $LP_T$ plus $L_D$, then the method proceeds to block 624.

At block 620, a determination is made as to whether the low side pressure $P_L$ is less than $LP_T$ minus $L_D$. For example, the cooling controller 208 makes this determination. If the low side pressure is not less than $LP_T$ minus $L_D$, the method proceeds to block 626. If the low side pressure is less than $LP_T$ minus $L_D$, the method proceeds to block 622.

At block 622, the compressor speed set point is decreased. For example, the cooling controller 208 outputs the compression control signal 212 to decrease the compressor speed.

At block 624, the compressor speed set point is increased. For example, the cooling controller 208 outputs the compression control signal 212 to increase the compressor speed.

At block 626, the fan speed and compressor speed are updated. For example, the cooling controller 208 performs filtering to determine how to update the fan speed and the compressor speed to obtain desired cooling operations.

At block 628, a determination is made as to whether a request for a cooling change has occurred. For example, the battery system controller 104 outputs the switch control signals (SC1-3) to enable and disable selected evaporators, thereby changing the number of evaporators that are enabled in the cooling system. If a request to change the cooling system has not occurred, the method proceeds to block 606. If a request to change the cooling system has occurred, the method proceeds to block 630.

At block 630, one or more evaporators are enabled or disabled. For example, the battery system controller 104 outputs the switch control signals (SC1-3) to enable or disable selected evaporators. The method proceeds to block 606 to adjust the cooling and compression of the system to accommodate the change in the number of enabled evaporators.

Thus, the method 600 operates to provide a vapor-compression multi-evaporator cooling system. It should be noted that the operations of the method 600 are exemplary, and not exhaustive, and that the operations may be changed, modified, combined, rearranged, deleted, and/or added to within the scope of the embodiments.

Figure 7:
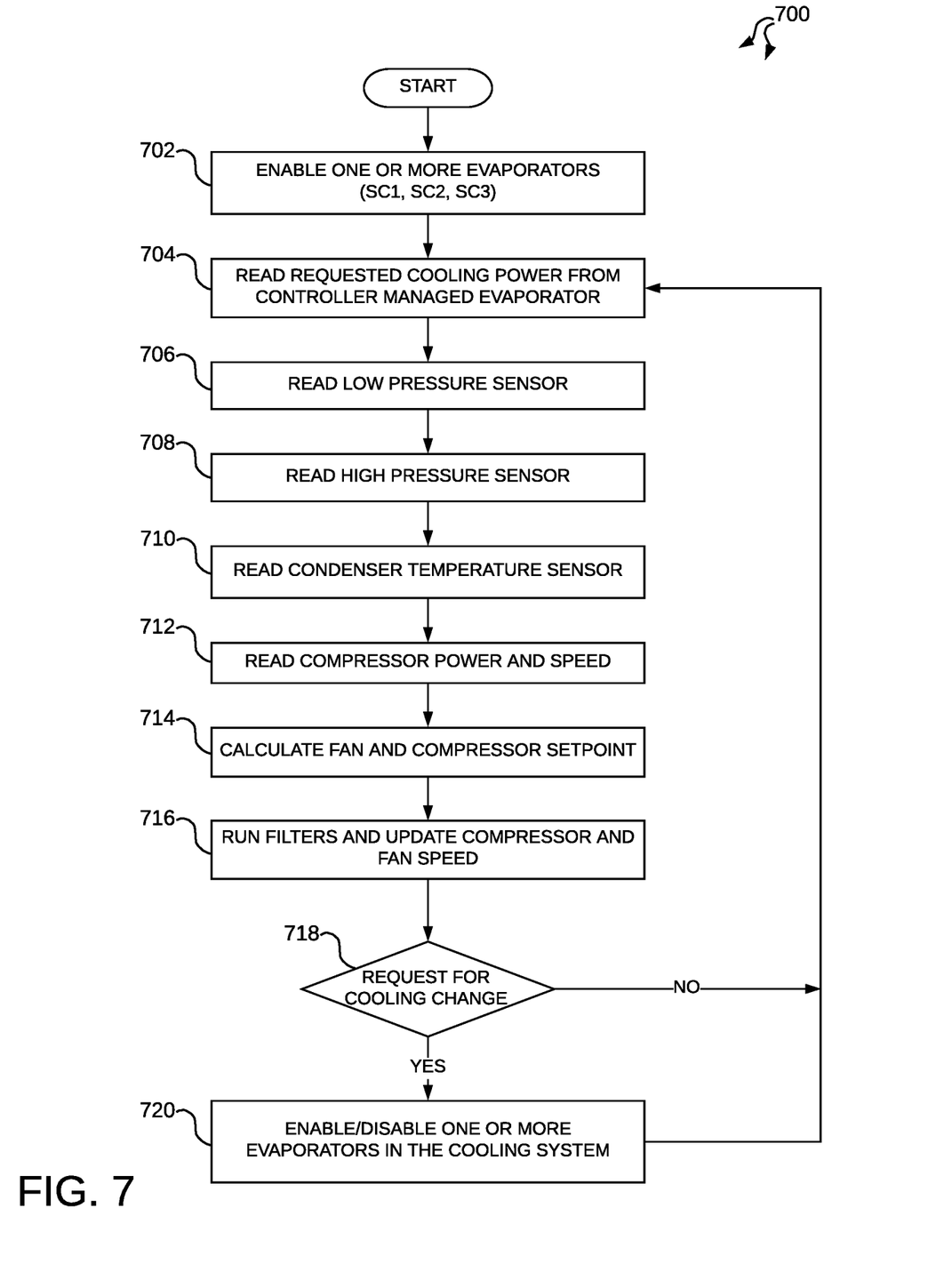
FIG. 7 shows another embodiment of a method for operating a vapor-compression cooling system which has a selectable number of evaporators.

FIG. 7 shows an embodiment of a method 700 for operating a vapor-compression multi-evaporator cooling system. For example, the method 700 is suitable for use with the cooling system shown in FIG. 2.

At block 702, one or more evaporators are enabled. For example, the battery control system 104 outputs the switch control signals (SC1-3) to enable the corresponding expansion valves, thereby enabling one or more of the evaporators 1-3 into the cooling system.

At block 704, an operation to read requested cooling power from a controller managed evaporator is performed.

At block 706, the low side pressure ($P_L$) of the compressor is measured. For example, the cooling controller 208 receives the low side pressure ($P_L$) measurement from the pressure sensor PL.

At block 708, the high side pressure ($P_H$) of the compressor is measured. For example, the cooling controller 208 receives the high side pressure ($P_H$) measurement from the pressure sensor PH.

At block 710, a condenser temperature measurement is read. For example, the cooling condenser 208 receives a condenser temperature measurement from the temperature sensor 228.

At block 712, compressor power and speed measurements are taken. For example, the cooling controller 208 obtains the compressor power and speed information as part of the compression control signal 212.

At block 714, a fan speed setpoint and a compression speed setpoint are calculated. For example, the controller 208 calculates these setpoints.

At block 716, filtering is performed and updated compressor and fan speeds are determined to obtain desired cooling operation.

At block 718, a determination is made as to whether a request for a cooling change has occurred. For example, the battery system controller 104 outputs the switch control signals (SC1-3) to enable and disable selected evaporators of the cooling system. If a request to change the cooling system has not occurred, the method proceeds to block 704. If a request to change the cooling system has occurred, the method proceeds to block 720.

At block 720, one or more evaporators are enabled or disabled. For example, the battery system controller 104 outputs the switch control signals (SC1-3) to enable or disable selected evaporators. The method proceeds to block 704 to adjust the cooling and compression of the system to accommodate the change in the number of enabled evaporators.

Thus, the method 700 operates to provide a vapor-compression multi-evaporator cooling system. It should be noted that the operations of the method 700 are exemplary, and not exhaustive, and that the operations may be changed, modified, combined, rearranged, deleted, and/or added to within the scope of the embodiments.

Although certain specific exemplary embodiments are described above in order to illustrate the invention, the invention is not limited to the specific embodiments. Accordingly, various modifications, adaptations, and combinations of various features of the described embodiments can be practiced without departing from the scope of the invention as set forth in the claims.

What is claimed is:

1. A method comprising:
    adjusting air flow provided to a condenser of a multi-evaporator cooling system in response to a comparison of a first system pressure to a first pressure setpoint; and
    adjusting a speed of a compressor of the multi-evaporator cooling system in response to a comparison of a second system pressure to a second pressure setpoint, wherein the speed of the compressor is adjusted while the compressor is operating.

2. The method of claim 1, wherein a high side system pressure represents the first system pressure, and the method comprises:
    increasing air flow provided to the condenser when the high side system pressure is greater than a first setpoint; and
    decreasing air flow provided to the condenser when the high side system pressure is less than the first setpoint.

3. The method of claim 1, wherein a low side system pressure represents the second system pressure, and the method comprises:
    increasing compressor speed when the low side system pressure is greater than a second setpoint; and
    decreasing compressor speed when the low side system pressure is less than the second setpoint.

4. A method for controlling cooling capacity of a multi-evaporator cooling system, the method comprising:
    measuring a pressure difference between a high side and a low side of the cooling system; and
    adjusting a speed of a compressor and air flow provided to a condenser in response to a comparison of the pressure difference to a threshold, wherein the speed of the compressor is adjusted while the compressor is operating.

5. The method of claim 4, wherein when the pressure difference is greater than the threshold, then performing operations of:
   increasing air flow provided to the condenser; and
   decreasing compression provided by the compressor.

6. The method of claim 5, wherein the operation of increasing air flow comprises an operation of increasing fan speed of a fan that produces air flow across the condenser.

7. The method of claim 5, wherein the operation of decreasing compression comprises an operation of decreasing compressor speed of the compressor.

8. The method of claim 4, wherein when the pressure difference is less than the threshold, then performing operations of:
   decreasing air flow provided to the condenser; and
   increasing compression provided by the compressor.

9. The method of claim 8, wherein the operation of decreasing air flow comprises an operation of decreasing fan speed of a fan that produces air flow across the condenser.

10. The method of claim 8, wherein the operation of increasing compression comprises an operation of increasing compressor speed of the compressor.

11. The method of claim 4, further comprising:
   changing a configuration of the cooling system wherein one or more evaporators in the cooling system are enabled or disabled; and
   repeating the operations of measuring and adjusting.

12. A system comprising:
   a compressor;
   a selectable number of evaporators each with an expansion valve;
   a condenser coupled to the compressor, wherein the condenser is also coupled to the expansion valves;
   a fan that provides air flow to the condenser; and
   a controller that measures a pressure difference between a high side and a low side of the compressor, and wherein when the pressure difference is less than a threshold, the controller controls the fan to decrease air flow provided to the condenser and the controller controls the compressor to increase compression while the compressor is operating.

13. The system of claim 12, wherein when the pressure difference is greater than the threshold, the controller controls the fan to increase air flow provided to the condenser and the controller controls the compressor to decrease compression.

14. The system of claim 13, wherein the fan is a variable speed fan and the compressor is a rotary compressor or a scroll compressor.

15. The system of claim 14, wherein the controller decreases air flow by reducing a fan speed of the variable speed fan to reduce air flow across the condenser.

16. The system of claim 14, wherein the controller increases compression by increasing a rotary speed of the rotary compressor.

17. The system of claim 14, wherein the controller increases air flow by increasing a fan speed of the variable speed fan to increase air flow across the condenser.

18. The system of claim 14, wherein the controller decreases compression by decreasing a rotary speed of the rotary compressor.

19. The system of claim 12, further comprising a plurality of evaporators coupled between the condenser and the compressor, and wherein as the evaporators are selectively enabled and disabled, the controller determines a corresponding pressure difference and adjusts the fan and compressor to obtain a desired operating level.

\* \* \* \* \*